United States Patent [19]
Mason

[11] Patent Number: 5,144,587
[45] Date of Patent: Sep. 1, 1992

[54] EXPENDABLE MOVING ECHO RADIATOR

[75] Inventor: Russell I. Mason, Glens Falls, N.Y.

[73] Assignee: The United States of America as represented by the Secretary of the Navy, Washington, D.C.

[21] Appl. No.: 722,581

[22] Filed: Jun. 27, 1991

[51] Int. Cl.$^5$ .............................................. H04K 3/00
[52] U.S. Cl. ........................................ 367/1; 367/137; 367/165
[58] Field of Search .......................... 367/1, 137, 165; 434/10; 114/322

[56] References Cited

U.S. PATENT DOCUMENTS

3,921,559  11/1975  Wells, Sr. ................................. 367/1

Primary Examiner—Daniel T. Pihulic
Attorney, Agent, or Firm—Michael J. McGowan; Prithvi C. Lall; Michael F. Oglo

[57] ABSTRACT

An expendable moving echo radiator suitable for providing a decoy to attract a homing torpedo and divert the torpedo away from its intended target is disclosed. The present invention provides an expandable and collapsible curtain for deployment from a capsule launched from a submarine or other sea vessel. In its expanded configuration, the curtain is characterized by a physical profile sufficient to reflect acoustic waves and to generate echoes substantially similar to echo signals generated by an actual, full size submarine or other target. The present invention is further provided with propulsion means, as well as means for enhancing its capability to capture a torpedo's sensors. It can also be provided with explosives to destroy lured torpedoes. The expendable device can be used to simulate a submarine for anti-submarine warfare (ASW) training, thereby affording the advantage that a package of easily transportable size becomes a full size submarine-like target. In using the echo radiator as a target, the expendable device can be preprogrammed or remotely controlled for self-navigation purposes.

23 Claims, 4 Drawing Sheets

EXPENDABLE MOVING ECHO RADIATOR

STATEMENT OF GOVERNMENT INTEREST

The present invention may be manufactured and used by or for the Government of the United States of America for governmental purposes without the payment of any royalties thereon or therefor.

BACKGROUND OF THE INVENTION (1) Field of the Invention

The present invention is generally related to a marine warfare countermeasure system and, more specifically, to an expendable echo radiating device suitable for providing a decoy to attract a homing torpedo, and to divert the homing torpedo away from its intended target. The device also has application as a realistic expendable, pre-programmed or remote control training device for anti-submarine warfare (ASW) training.

(2) Description of the Prior Art

A typical self-propelled anti-submarine torpedo is equipped with some type of electronic homing equipment for enabling the torpedo to seek out its target. For example, a torpedo can be equipped with a sensitive passive acoustic receiver for detecting sound waves emitted by an enemy vessel wherein the received sound waves control the torpedo's navigation and guidance equipment to direct the torpedo toward its target. Alternatively, a homing torpedo may be equipped with an active homing system wherein the torpedo itself generates and transmits an acoustic signal, the torpedo being guided to the target by the echo produced as this transmitted sound wave reflects off of a target. Some torpedoes utilize other homing sensors that are capable of sensing and following a wake left by a ship or other object moving through the water.

Modern submarines and other sea vessels are provided with various apparatus for defending against an incoming homing torpedo. One approach for providing protection against incoming torpedoes is to provide a decoy device for attracting a torpedo and to divert it away from its intended target. The present invention provides a novel expendable moving echo radiator for presenting a luring target to a torpedo's homing equipment, thereby diverting the torpedo away from its intended target.

SUMMARY OF THE INVENTION

The present invention provides an expendable moving decoy for deployment from a submarine or other marine vessel. The decoy provides an apparatus that reflects or interferes with a torpedo's homing signals to attract and direct the torpedo away from its intended target, i.e., the submarine or other marine vessel. Thus, the apparatus of the present invention provides an echo producing or noise generating device designed to provide acoustic and electronic signals substantially similar to those generated by an actual target such that the homing equipment of the torpedo will be deceived into treating the device as its intended target and will be guided in the direction thereof. The present invention can also deposit a wake-like track intended to be sensed by the torpedo to divert it from its actual target.

In accordance with the present invention an expendable propellant capsule, which provides a housing for a propulsion system and for an expandable and collapsible "curtain", is launched or released from a submarine or a surface vessel. The capsule is initially linked to the launching vessel via a "tow" line which assists in deploying the curtain from the capsule thus extending the curtain rapidly to its expanded configuration. The curtain may be comprised of a mesh of metallic material, a mesh of cloth material, a mesh of a combination of metallic and cloth material, or a multiplicity of strips or cables of metallic material. Once deployed, this curtain expands to have a physical length and height profile of a submarine sufficient to reflect acoustic waves and to generate echo signals substantially similar to signals produced by an actual submarine or other target.

The propulsion system of the present invention, which may comprise either an electric or a pneumatic drive system, provides a means to propel the deployed curtain so that the echo returns generated by the curtain create a moving target, further luring the homing torpedo to change its course away from the real submarine or other target. This propulsion system also provides a capability for the expendable moving echo radiator of the present invention to perform its operations at an increasing distance away from its launching vessel, thereby reducing the possibility of the torpedo being armed in close proximity to the submarine or other vessel and further reducing the possibility of damage to such vessel from the percussion wave effects created by explosion of the torpedo's warhead, either by accident or by detonation thereof by the echo radiator.

The curtain of the present invention is further provided with means for generating air pockets or gas bubbles and/or with noise or other signal generating means for enhancing its capability to engage a torpedo's homing sensors. Additional features can be provided via plastic or other explosives mounted on the deployed curtain for destroying a successfully lured torpedo.

The present invention also has use as a test target for torpedo studies and testing. The expendable device can also serve as a remotely controllable anti-submarine warfare (ASW) training device such that anti-submarine warfare vessels can carry and launch an expendable, low cost imitation of a moving "practice submarine" during training missions.

DESCRIPTION OF THE DRAWINGS

The present invention will be more fully understood from the following detailed description, taken in conjunction with the accompanying drawings in which.

DESCRIPTION OF THE PREFERRED EMBODIMENT

Figure 1:
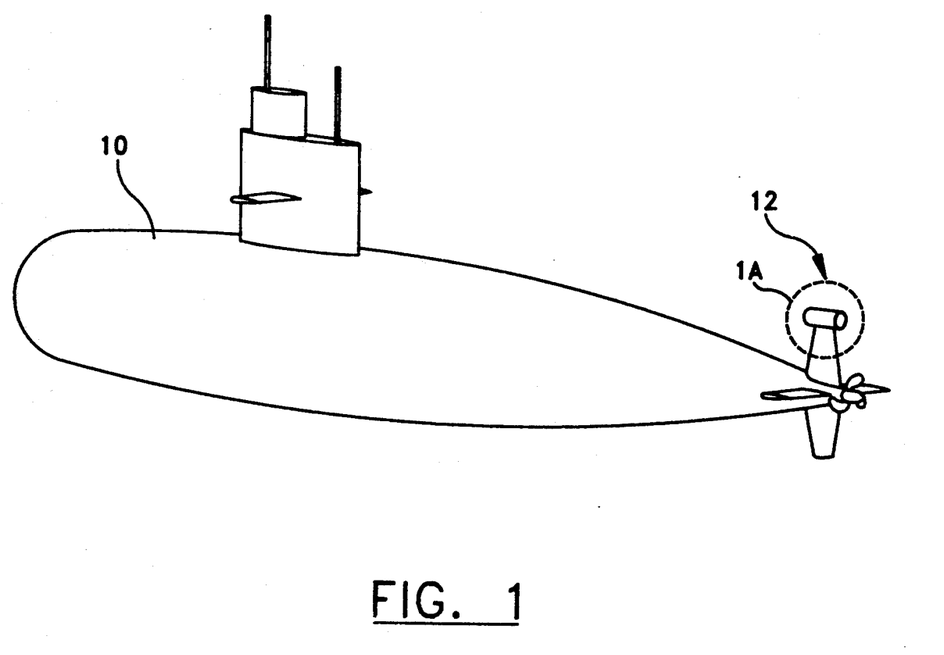
FIG. 1 depicts one illustrative arrangement for housing the expendable, self-propelled, echo radiator of the present invention in connection with the outboard structure of a submarine (more specifically the echo radiator being housed by structure which is adjacent to the submarine's tailfins structure).
Figure 1A:
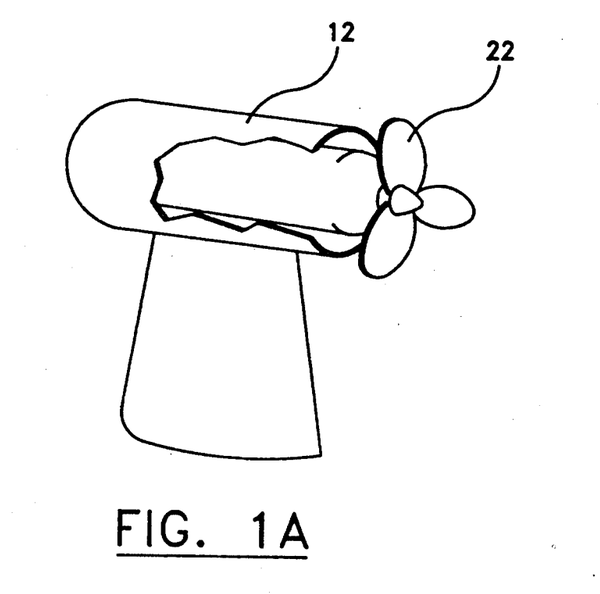
FIG 1A is an enlarged fragment of the portion of FIG. 1 circumscribed by dashed circular line 1A, showing in greater detail a pylon/fin housing structure and one illustrative embodiment of a echo radiator (which has a "tractor" propeller for propelling the echo radiator rearwardly from the submarine).

Referring now to FIGS. 1 and IA, there is shown a submarine 10 equipped with a launch pylon 12 mounted on the tail fin structure thereof, although any other suitable mounting location could be employed without departing from the inventive concept. The launch pylon 12 houses at least one releasable capsule 20, FIG. 2, and each capsule 20 and its contents constitute an individual expendable moving echo radiator 21. It will be understood that the capsule 20 can be made to be a size and shape substantially equivalent to a Mark 46 torpedo or a large sonobuoy such that the expendable device of the present invention can be launched directly from any suitable existing launch port in a submarine hull, as for example, a torpedo tube, or an external housing, thereby eliminating the requirement of mounting a launch pylon 12 on the submarine 10. It will be further understood that although the detailed description herein relates to the deployment of an expendable echo radiator from a submarine 10, the echo radiator 21 of the present invention may also be deployed from a surface vessel for use as a protective decoy or for anti-submarine training.

Referring again to FIG. 2, expendable echo radiator 21 comprises a curtain 30, shown in its deployed condition. After launch the capsule 20 is initially linked to the submarine 10 via tow line 14. The echo radiator of the present invention further includes a propulsion system carried by capsule 20, as will be described.

The propeller 22 shown in FIG. IA (and subsequent FIGS.) is a "tractor" type propeller. Employing a tractor type propeller enables the rear, or stern, end of echo radiator 21 to be free of propeller action. This in turn facilitates easier deployment of the echo radiator's curtain (which curtain will be described and discussed later herein). However, it is to be understood that the invention, in its broader aspects, is intended to cover embodiments which employ a "pusher" propeller at the echo radiator's stern end, and for which the arrangement of deploying the curtain is not interfered with by the action of the pusher propeller.

Figure 2:
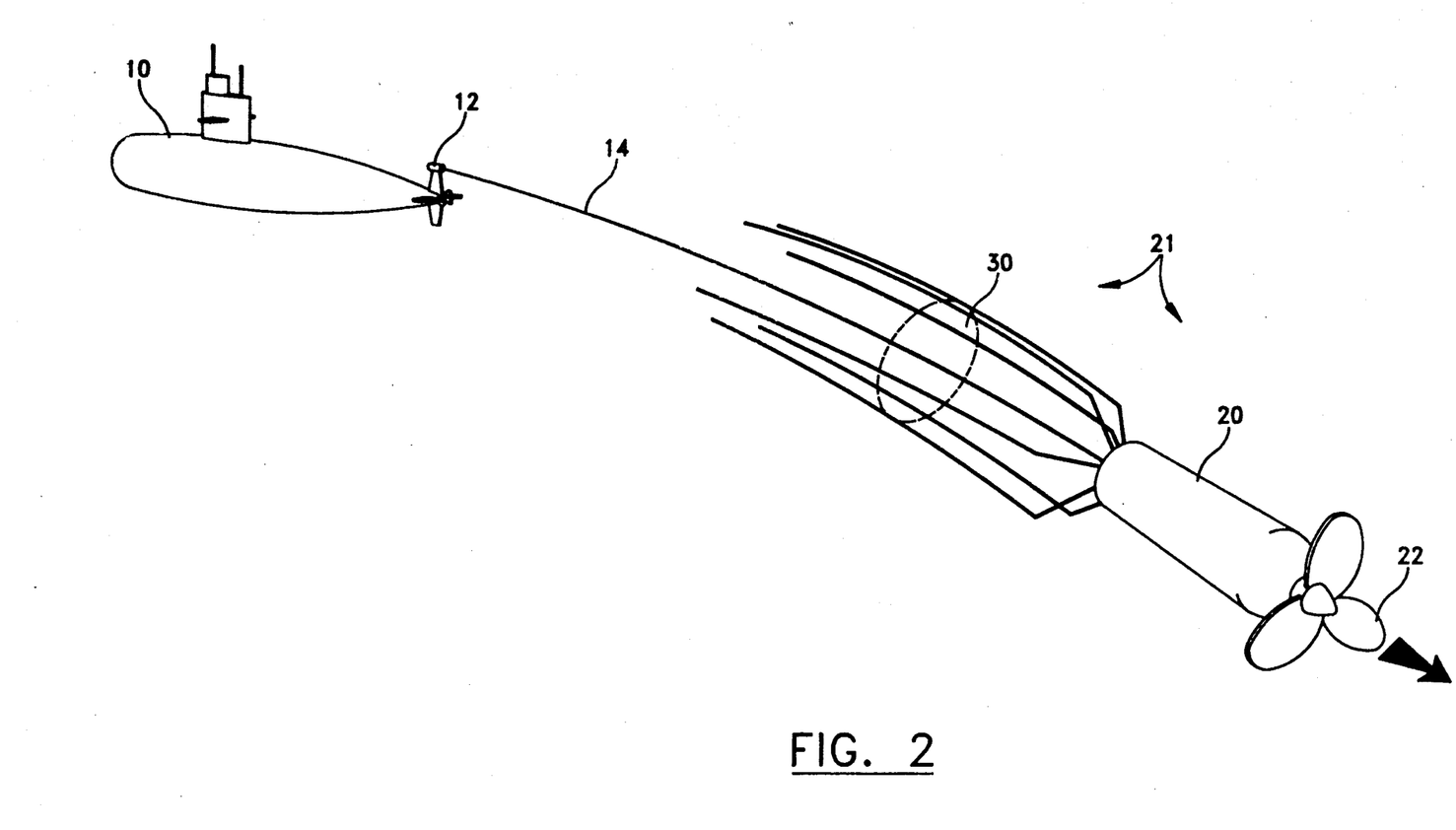
FIG. 2 is a diagrammatic representation of the expendable, self-propelled echo radiator during the initial phase of deployment of the echo radiator from the submarine.

Upon detection or indication of an incoming torpedo, the capsule 20 is released from the submarine 10 or surface vessel being threatened. At the time of this release, curtain 30 is housed in capsule 20 in a collapsed configuration. Tow line 14 is utilized to assist in initially launching and dispensing the curtain 30 by pulling it from within the capsule 20, and dragging the same thereout as the submarine 10 travels away from the capsule 20 during deployment. Before deployment, curtain 30 is contained in capsule 20 in a suitable collapsed configuration. More specifically the curtain is suitably folded, spooled or rolled with the construction and arrangement such that it becomes deployed by force of submarine 10 pulling on tow line 14. In an alternative embodiment of invention, curtain 30 becomes deployed by force of hydrodynamic drag as the capsule moves forward by means of self propulsion.

Curtain 30 is fabricated of any material that is suitable for such deployment and that is suitable for implementing the hereinafter described generic features of radiator 21 and for implementing any selectively desired hereinafter described optional features as well. Among suitable materials are : (a) metallic mesh screen; (b) mesh cloth; (c) a mesh partly of metallic material and partly of cloth; (d) multiple, parallel, metallic strips, and (e) multiple, parallel wire cables. When the pulling force of submarine 10 through tow line 14 is employed to deploy the curtain, the tow line 14 is allowed to extend to a span equal to a predetermined safety standoff distance. This distance is chosen to reduce the launching vessel's vulnerabilities in connection with the echo radiator 21 luring an armed homing torpedo toward itself, and also to reduce the likelihood of echo radiator 21 encumbering the launching vessel's navigational freedom. Such a safety standoff distance exceeds 300 yards. Upon achieving a safe standoff distance, tow line 14 is severed. (Of course, no tow line 14 whatsoever is necessary in connection with the alternative embodiment of invention in which curtain 30 is deployed by force of hydrodynamic drag as capsule 20 streams through the water by means of self propulsion). Echo radiator 21 travels through the ocean medium under the power of a self-contained propulsion system, as will be presently described.

The streaming curtain 30 simulates a full size echo producing target having a length and height profile substantially similar to that of a submarine or other large target. Thus, the apparatus of the present invention provides a large, low drag echo radiator designed to produce a realistic electronic image of a submarine by yielding a target strength and echo characteristics substantially equivalent to those of a full size submarine or other equivalent vessel. Also, when curtain 30 is thusly streaming, echo radiator 21 leaves a trailing wake which lures homing torpedoes which sense and follow a wake left by an object moving through water.

Figure 3:
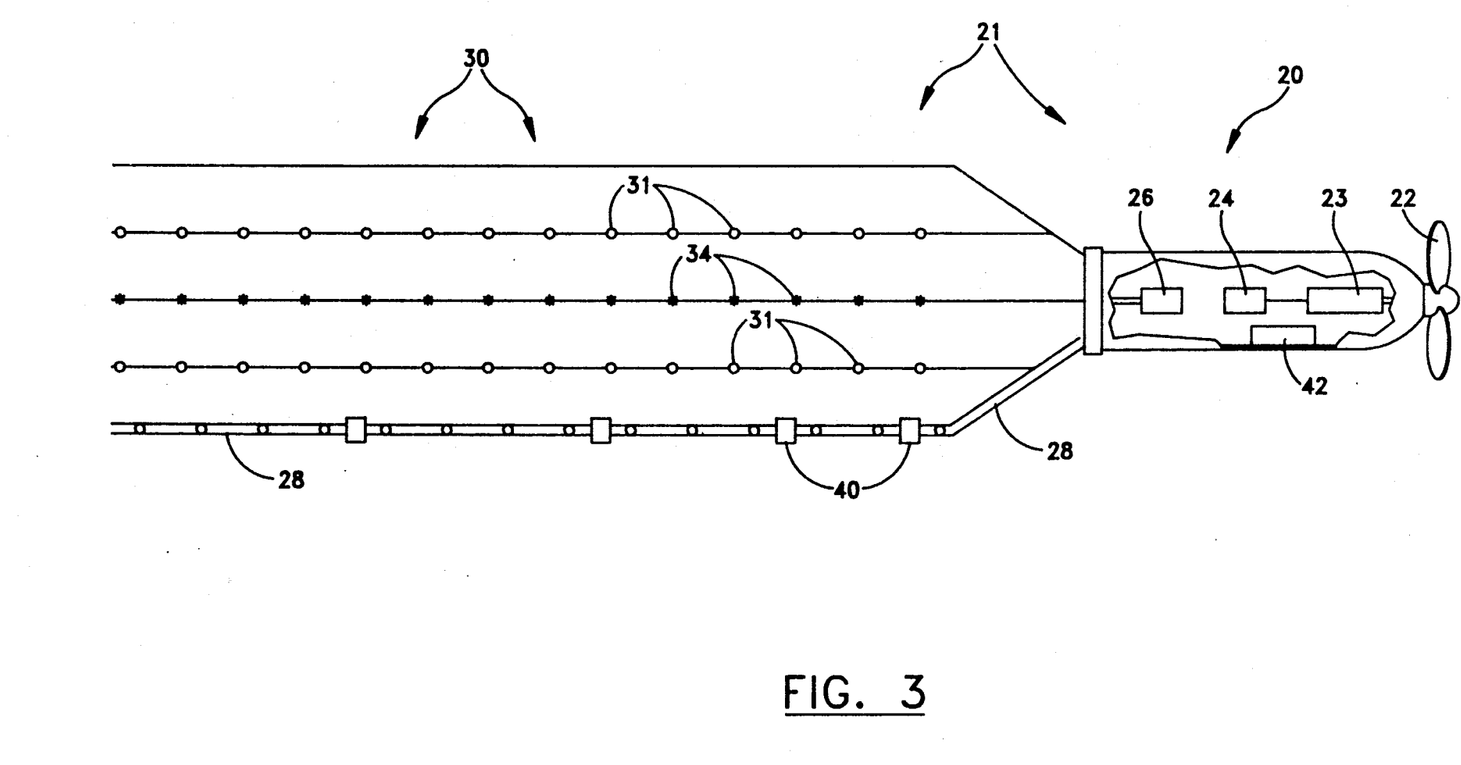
FIG. 3 is in part a diagrammatic representation, and in part a block diagram, illustrating the invention and various alternate and modified forms thereof.

The propulsion system, housed within the capsule 20, propels the low drag echo radiator through the marine environment with sufficient and realistic speed to maintain the curtain 30 in its expanded submarine size configuration. The propulsion system may comprise a propeller 22, FIGS. 1A, 2, 3 and 4, and a drive motor 23 (only FIGS. 3 and 4), which is powered by a high-energy, quick discharge electrochemical energy source 24. Energy source 24 is of the type that provides electrical power for a relatively short period of time, which is substantially equivalent to the relatively short endurance power source of a homing torpedo. This short-term power requirement allows for the use of a relatively light and inexpensive electrochemical source that does not require large, power hungry, longer endurance components.

An alternative form of propulsion system could comprise a pneumatic drive engine 25 (only FIG. 4), for providing propelling force via exhaust air pressure. The air medium for engine 25 is furnished from a compressed air bottle 26.

It is to be appreciated that in addition to contributing to expendable echo radiator 21's decoying capability, the provision of radiator 21's self propulsion capability decreases the effectiveness of an attacking torpedo by causing any arming of the torpedo as the result of the decoy action of radiator 21 to take place farther from the launching vessel than without self propulsion. Therefore the percussion wave effects of warhead detonation would be reduced.

Various alternate or modified forms of invention are within the scope of the inventions. The type of alternate or modified forms of inventions to be presently discussed generally relate to various modes of radiation (including echo radiation) for decoying or luring an attacking torpedo.

Figure 4:
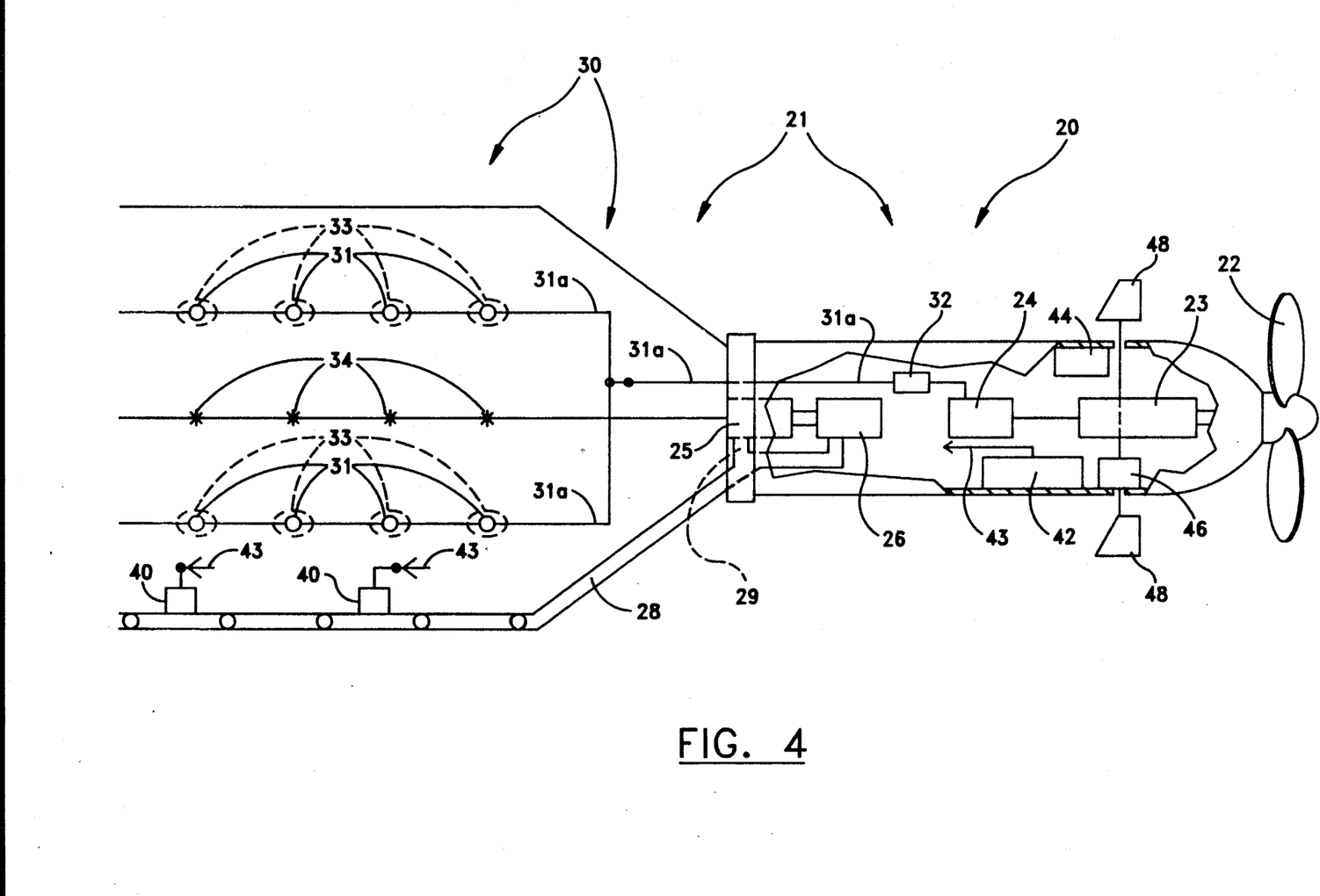
FIG. 4 is an enlargement of a portion of FIG. 3, showing some additional block diagram elements which were left off FIG. 3 because of space limitations due to the smaller scale of FIG. 3.

Reference is now made to FIG. 4 for an embodiment of invention that affords enhancement of expendable echo radiator 21's capability to decoy/lure a torpedo, by the provision of a means for furnishing a gaseous medium along the surface of the curtain 30. The forms which the gaseous medium may take include air pockets, clouds of bubbles and coatings of bubbles. For example, at least one perforated hose 28 may have its gas medium supplied to it from a compressed air bottle 26, or in a case of a capsule 20 employing the alternate pneumatic drive engine 25 by an exhaust air tapping conduit 29 which conducts exhaust air from drive engine 25 to perforated hose 28. Air pockets, clouds of air bubbles, or coatings of air bubbles form at the perforations in hose 28. Note that in those embodiments of echo radiator 21 in which the propulsion system is provided in the form of pneumatic drive engine 25, the utilization of the engine's gaseous exhaust as gaseous medium furnished along curtain 30 constitutes conjunct use of the propulsion system as (i) a means of propulsion, and (ii) a source of pressurized gaseous medium for the system for furnishing same along the surface of curtain 30. Stated from a somewhat different viewpoint, if propulsion of the echo radiator is considered to be the primary function of drive engine 25, then the echo enhancing effects produced by discharging the gaseous exhaust medium through perforated hose 28 may be regarded as an incidental byproduct function which devolves from the primary propulsion function of drive engine 25. Equivalent results might also be achieved via other materials or chemicals which react with the sea water to produce air bubbles over a limited time. These longitudinally spaced air pockets, clouds of bubbles, or zones coated with bubbles are distributed over the expanse of curtain 30 in a manner chosen to augment the echo radiation characteristics of the entire echo radiating curtain. More specifically, the places at which a gaseous medium is furnished are chosen to cause the well known echo highlight spots ("scintillating echoes") characteristic of an actual submarine target, to thereby engage or further attract a homing torpedo's sensing equipment.

It would also be within the scope of the invention for the means for furnishing a gaseous medium to be tailored to produce an air pocket, bubble cloud, or coating of bubbles along the entire length of the curtain 30 or along only a portion of the length thereof, thereby enhancing the electronic/acoustic image produced by the curtain 30.

It may be further desirable to dilute the exhaust gas with ammonia or some other material that is soluble with the exhaust gas and sea water to induce absorption of the exhaust gas into the sea water. By this feature, the generated air pockets, clouds of bubbles, or coatings of bubbles will have a limited life and the target profile and echo image provided by the curtain 30 will not be distorted due to a long trailing wake of air bubbles. The means for furnishing a gaseous medium may also be implemented by a plurality of suitable electrode couplet devices 31 made of suitable electrode material chosen to generate gas at one electrode of the couplet, all in accordance with well known basic principles of the electrolysis phenomenon. The electrode couplet devices 31 are energized through a network of suitable insulated cables 31a, which in turn connect to the output side of suitable electrical power distribution apparatus 32, which in turn directly connects with energy source 24.

The network of insulated cables 31a may be constructed as insulated conductors woven into the curtain mesh, or as streaming insulated cables. By furnishing electrical power from source 24 to devices 31 while the devices are immersed in ocean salt water the following electrolysis phenomenon is provided. There are literally generated coatings 33 of gaseous bubbles along the expanse of curtain 30 at a patch adjacent to each electrode coupled device 31. The bubbles also build up into a rising curtain or sheet of bubbles, thus producing a bigger target area. It is to be appreciated that in order for production of the gaseous medium by this electrolysis embodiment to be practicable, electrochemical energy source 24 must be capable of providing a relatively high level of power for the period of time corresponding to the period of time of a homing torpedo's attack (of the order of minutes). It is also to be appreciated that the structural feature of placing only a limited number of electrode coupling devices 31 along the expanse of curtain 30 favorably affects the practicability of exploiting electrolysis action as a means for furnishing the gaseous medium. Limiting the number of electrode couplet devices 31 limits the power required for the electrolysis action, and thereby permits utilizing an energy source 24 of sufficiently small enough weight and size for containment in capsule 20. Preferably, the locations at which electrode coupling device 31 are disposed over the expanse of curtain 30 are so chosen as to provide highlighted echo spots to simulate an actual submarine target. The principles of choosing the location of the outlets for the gaseous medium along curtain 30 to provide highlighted echo spots have been discussed hereinabove.

As will be understood by those of skill in the art, a curtain that can produce electrolytic bubbles can also serve as a means constituting underwater electric potential (UEP) elements. Further, it can be shown by well known conventional analysis that the characteristic of wide spacing of the coatings of bubbles over curtain 30 engenders better UEP performance than possible with closely spaced electrode elements characteristic of UEP prior art. Thus the above described feature of widely spaced generation of bubbles/coatings along curtain 30 effectively constitutes echo radiator 21 to contain widely spaced UEP elements. In accordance with conventional theory these elements can be designed to have predetermined electrical radiation patterns. In accordance with these design principles a radiation pattern is chosen for confusing the UEP sensor devices of an attacking torpedo. Alternatively, a radiation pattern could be chosen to sense an incoming torpedo's UEP radiations and thereby cause echo radiator 21 to respond in predetermined ways, such as triggering explosive charges 34 carried by curtain 30. (Later herein, in conjunction with another alternate form of invention, there is a further discussion of the explosive charges 34 carried by curtain 30.) The radiation pattern could also be chosen to constitute the UEP elements to be a sensing transducer for a UEP signal link enabling a mother ship to control echo radiator 21 after launch. (Alternatively, an underwater acoustic signal link could be employed for this purpose.)

Another alternative radiational scheme for decoying or luring homing torpedoes is the provision of active echo-repeaters 40, which are well known in the art. Echo-repeaters 40 are positioned in preselected spaced apart locations about the mesh of curtain 30, or along one or more constitutive streaming wires or cables of curtain 30. They operate to receive and retransmit signals which are emanating from a homing acoustic torpedo. Their positions about and along curtain 30 are chosen to produce the echo highlight phenomenon (discussed earlier) to simulate a submarine hull. Employing well known principles for the design of echo-repeater units, small low cost units can be provided for placement along the curtain. These echo-repeaters 40 are under control of suitable delay trigger electronic control circuitry 42, which in turn provides delay timing control signals to the individual echo-repeaters 40 via a suitable wiring network 43. In this way, conventional and well known principles can be employed to produce a more realistic enhanced echo appearance to better attract the torpedo, or to deceive a sonar operator on board a ship or other vessel.

It is to be appreciated that if echo radiator 21 will operate at significant depths, it is desirable to employ the echo repeater mode of decoying and luring attacking torpedoes to complement the mode of enhancing the echo profile of radiator 21 by furnishing a gaseous medium along curtain 30. When echo radiator 21 operates at greater depths the generation of gaseous medium pockets, bubble clouds, or bubble coatings will tend to become less effective due to the increased pressure of the ocean medium. As depths are reached where furnishing a gaseous medium becomes ineffective, or only marginally effective, the echo repeaters mode may become echo radiator 21's only effective mode of confusing the sensing and homing equipment of an attacking torpedo.

Still another alternative scheme for decoying or luring homing torpedoes is the provision of realistic acoustic noises or sounds that simulate the noise of an actual target vessel. Such noise source 44, FIG. 4, can be implemented by various means including employment of a conventional frequency oscillator, or including employment of an amplifier for amplifying noise which emanated from actual submarines and which was recorded. Alternate or modified forms of inventions involving features which constitute modes of enhancing expendable echo radiator 21's capability to decoy or lure an attacking torpedo have just been described and discussed. Further alternate or modified forms of invention which otherwise enhance the protection echo radiator 21 affords its launching vessel and/or which increase the scope of utilization of echo radiator 21 will now be discussed.

There can be in capsule 20 the provision of a means for controlling the path of travel of the present invention. Such control means can be implemented via a programmable autopilot device 46 operationally connected to steering fins 48, for providing a pre-programmed course through which the curtain 30 will travel. Alternatively, capsule 20 can be provided with a receiver (not shown) which can be coupled to the UEP element for receiving remote control guidance signals from the launching submarine 10 or other vessel. The provision of either preprogrammed or remotely controlled course and depth changes creates a more realistic target signature for attracting the homing torpedo. It also serves the purpose of enabling echo radiating curtain 30 to operate at a greater, and therefore safer, distance from the launching submarine 10. Stated another way, provision of a means for predetermining or remotely controlling the course of expendable echo radiator 21 both (i) increases the effectiveness of echo radiator 21 as a decoy, and (ii) reduces the likelihood that the launching submarine or other launch vessel will be damaged by a percussion wave produced if echo radiator 21 induces detonation of the attacking torpedo's warhead. Guidance from the launching vehicle could also be implemented using well known wire-guided control technology for underwater vehicles.

One alternate use of expendable echo radiator 21 is as a remotely controllable anti-submarine warfare (ASW) training device. This involves echo radiator 21 being carried by an anti-submarine warfare vessel and launched as an expendable, low cost imitation of a moving "practice submarine" during training exercises. When serving such use, echo radiator 21 is provided with programmable autopilot 46, or alternatively or a remote control receiver, operationally connected to steering fins 48.

Another alternate use of expendable echo radiator 21 is as a test target for torpedo studies and torpedo testing. This too could involve provision of programmable autopilot 46 operationally connected to steering fins 48.

Reference is again made to FIG. 4, now for an embodiment of invention that enhances expendable echo radiator 21's chances of stopping an attacking torpedo. Structurally attached to curtain 30 are explosive charges 34 which are formed from a plastic explosive material and which include suitable impact and/or proximity triggering means (not shown). For example, by placing a series of such arrangements of charges along the constitutive wires or mesh of the curtain 30, the event of the incoming torpedo striking curtain 30, or coming within the triggering range of a proximity triggering device, will destroy or disable the torpedo.

It is to be understood that any and all of the alternative forms of invention or improved forms of invention discussed herein can be implemented individually or in combination, in accordance with the specific demands of the operational environment.

It will be appreciated that the present invention is not limited to the particular embodiments disclosed herein and that various changes may be made to the invention such that all matter set forth herein or shown in the accompanying drawings is to be interpreted as illustrative only, embracing all modified forms thereof as may be within the scope of the following claims.

What is claimed is:

1. An expendable echo radiator suitable for providing a decoy for attracting or diverting a homing torpedo away from an intended target, comprising:
    an expandable curtain having a collapsed configuration and an expanded configuration;
    a capsule for housing said curtain in said collapsed configuration;
    said curtain in its expanded configuration providing a profile similar to a profile of a marine vessel, thereby providing an echo radiator to decoy a homing torpedo from the intended target;
    propulsion means for propelling the echo radiator through the ocean medium, said propulsion means comprising at least one propeller;
    an electric motor mounted to said capsule for rotating said at least one propeller; and
    an electro-chemical energy source mounted to said capsule and coupled to said motor for providing electrical energy thereto.

2. An expendable echo radiator suitable for providing a decoy simulating a marine vessel, comprising:
    an expandable at least partially metallic curtain having a collapsed configuration and an expanded configuration;

a capsule for housing said curtain in said collapsed configuration;

an electrochemical energy source within said capsule; and bubble producing means coupled to said electrochemical energy source and cooperative with the metallic material of said at least partially metallic curtain for electrolytically generating gaseous bubbles along at least a portion of the curtain in its expanded configuration;

said bubbles cooperating with said curtain in its expanded configuration to provide an echo profile substantially similar to an echo profile of said marine vessel.

3. An expendable echo radiator suitable for providing a simulated target for use as an anti-submarine warfare (ASW) training device, comprising:

an expandable curtain having a collapsed configuration and an expanded configuration;

a capsule for housing said curtain in said collapsed configuration;

propulsion means for propelling said capsule through the ocean medium;

said curtain in its expanded configuration providing a profile similar to a profile of a target, thereby providing an echo radiator to produce a simulated target for use as an anti-submarine warfare (ASW) training device;

said propulsion means for propelling the echo radiator through the ocean medium including at least one propeller;

an electric motor mounted to said capsule for rotating said at least one propeller; and an electro-chemical energy source mounted to said capsule and coupled to said motor for providing electrical energy thereto.

4. The expendable echo radiator of claim 1 wherein said propulsion means comprises:

a pneumatic engine mounted to said capsule for propelling said echo radiator; and a container of compressed gaseous medium mounted to said capsule and coupled to said pneumatic engine.

5. The expendable echo radiator of claim 1, wherein: said curtain is deployed to its expanded configuration from its collapsed configuration in the capsule by hydrodynamic drag of the ocean acting upon the curtain while the capsule is propelled through the ocean medium by said propulsion means.

6. An expendable echo radiator suitable for providing a decoy for attracting or diverting a homing torpedo away from an intended target, comprising:

an expandable curtain having a collapsed configuration and an expanded configuration;

a capsule for housing said curtain in said collapsed configuration;

said curtain in its expanded configuration providing a profile similar to a profile of a marine vessel, thereby providing an echo radiator to decoy a homing torpedo from the intended target; and means for furnishing a gaseous medium along at least a portion of the curtain in its expanded configuration that emanates from different regions thereof to thereby enhance the echo radiation characteristics thereof by simulating highlighted echo spot signatures characteristic of the marine vessel.

7. The expendable echo radiator of claim 6, wherein said means for furnishing a gaseous medium comprises:

a pneumatic engine mounted to said capsule for propelling the echo radiator through the ocean medium and which while operating discharges an exhaust gaseous medium; and at least one perforated hose coupled to said pneumatic engine to receive said exhaust gaseous medium and conduct same to be discharged from the perforations in the hose.

8. The expendable echo radiator of claim 6, wherein said means for furnishing a gaseous medium comprises:

a container of compressed gaseous medium mounted to said capsule; and at least one perforated hose coupled to said container to receive gaseous media and conduct same to be discharged from the perforations in the hose.

9. The expendable echo radiator of claim 6, further including:

means for inducing absorption of said gaseous medium into the ocean medium such that the gaseous medium disposed along the curtain will have a limited life.

10. The expendable echo radiator of claim 6, wherein said means for furnishing a gaseous medium comprises:

a plurality of electrolysis means disposed at selected positions over the expanse of said curtain in its expanded configuration to generate bubbles at each electrolysis means.

11. The expendable echo radiator of claim 10, wherein:

the generated bubbles coat a patch of the curtain adjacent each electrolysis means.

12. The expendable echo radiator of claim 10, wherein:

the generated bubbles form a rising, sheet-like, cloud of bubbles, whereby the profile similar to a profile of a marine vessel caused by the echo radiator is enlarged from that provided solely by the curtain.

13. An expandable echo radiator suitable for providing a decoy for attracting or diverting a homing torpedo away from an intended target, comprising:

an expandable curtain having a collapsed configuration and an expanded configuration;

a capsule for housing said curtain in said collapsed configuration;

said curtain in its expanded configuration providing a profile similar to a profile of a marine vessel, thereby providing an echo radiator to decoy a homing torpedo from the intended target; and a plurality of active echo-repeater means for receiving signals emanating from a homing torpedo and retransmitting said received signals to attract the homing torpedo, said active echo-repeater means being disposed at spaced positions over the expanse of said curtain.

14. The expandable echo radiator of claim 13, wherein said plurality of active echo-repeater means further include:

delay means for delaying said retransmission of said received signals to provide a more realistic appearance of a reflection from the intended target.

15. The expendable echo radiator of claim 1, further including:

an acoustic noise source mounted to said capsule for attracting a homing torpedo by simulating the underwater sounds of an actual target.

16. The expendable echo radiator of claim 15, wherein said acoustic noise source includes:

an oscillator for generating an acoustic signal having a predetermined frequency.

17. The expendable echo radiator of claim 15, wherein said acoustic noise source includes:
means for reproducing prerecorded sounds of an actual target.

18. The expendable echo radiator of claim 13, further including:
explosive means for percussively impacting a torpedo attracted thereto, said explosive means being positioned along at least a portion of said curtain.

19. The expendable echo radiator of claim 18, further including:
means operatively connected to said explosive means for providing proximity triggering of said explosive means.

20. The expendable echo radiator of claim 1 which is further characterized by the intended target being a marine vessel and the capsule being initially carried by the intended target and launched therefrom when the latter is approached by a homing torpedo, and in which:
a tow line links the marine vessel and the expandable curtain;
said curtain being deployed to its expanded configuration from its collapsed configuration housed in the capsule by being dragged from the capsule by force of the marine vessel, said force being transmitted from the marine vessel to the curtain by the tow line.

21. The expendable echo radiator of claim 20, wherein:
the tow line is severed when the curtain is in its expanded configuration and the marine vessel and the curtain are separated by a predetermined standoff distance.

22. The expendable echo radiator of claim 3, and:
communications means for receiving navigation control signals from a remote source.

23. The expendable echo radiator of claim 3, and:
autopilot means for providing a pre-programmed course of travel through the ocean medium.

* * * * *